Oct. 9, 1934.                T. RITCHIE                1,976,094
PLANT SUPPORT
Filed April 14, 1933
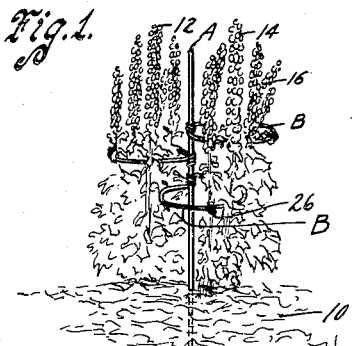
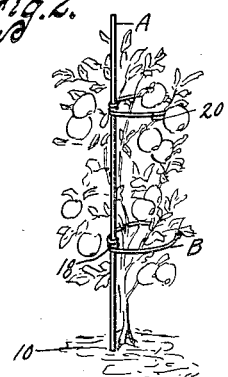
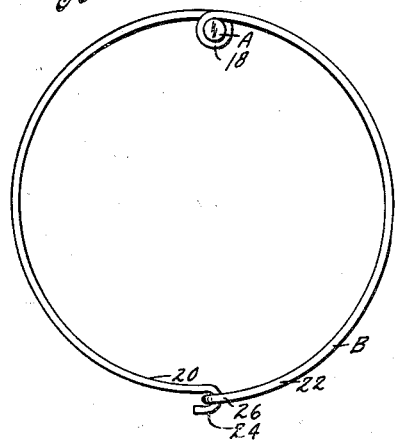
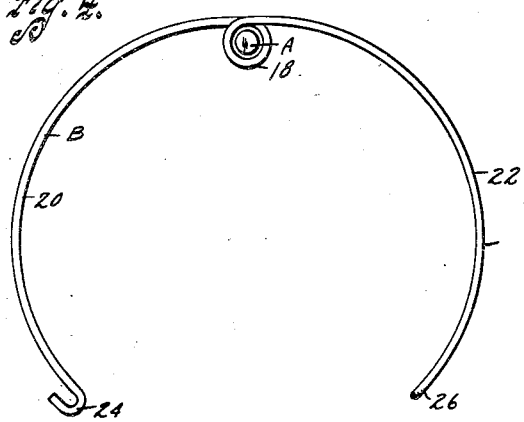
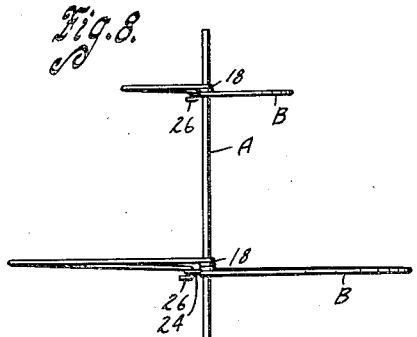
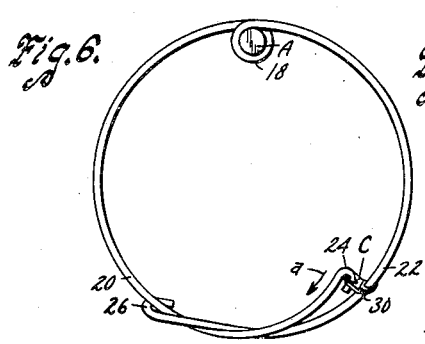
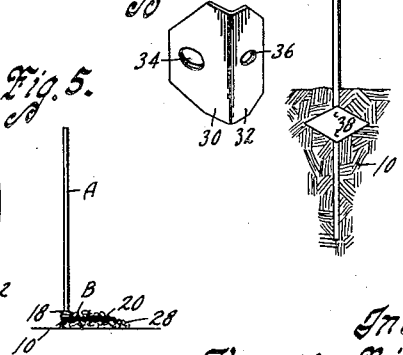
Inventor
~Thomas Ritchie~
By Bair, Freeman & Sinclair
Attorneys
Witness
H. S. Menzenmaier Patented Oct. 9, 1934

1,976,094

UNITED STATES PATENT OFFICE 1,976,094

PLANT SUPPORT

Thomas Ritchie, Oskaloosa, Iowa

Application April 14, 1933, Serial No. 666,146

8 Claims. (Cl. 47—47)

The object of my invention is to provide a plant support which is simple, durable and comparatively inexpensive to manufacture.

A further object is to provide a plant support which may be easily and readily placed in position and also easily taken up or moved to another location.

A further object is to provide a plant support which is inconspicuous, yet rugged in construction, while at the same time it is easy to place in position around a plant and can be quickly and easily adjusted up or down relative to a supporting rod as well as pivotally swung about the rod to any position desired.

More particularly, it is my object to provide a plant support comprising a rod-like supporting member and a loop-like plant encircling member, the plant encircling member being openable and adjustable both up and down and radially relative to the rod-like supporting member when in open position, yet being firmly locked against up and down movement or rotary movement relative thereto when in closed position about a plant.

Still a further object is to provide modified forms of the invention in which a binder clip serves to connect the plant encircling arms together so that their circumference may be adjusted and an anchor blade is secured to the rod-like supporting member to prevent it from turning in soft ground or when the wind blows the plant which is being supported by the support.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of my plant support showing it in use for three separate plants.

Figure 2 is a perspective view showing it in use for an especially tall plant.

Figure 3 is a plan view showing the support in encircling position.

Figure 4 is a plan view showing the encircling arms open.

Figure 5 is a side elevation showing the plant support used as a mulch holder.

Figure 6 is a plan view showing a modified form of construction.

Figure 7 is a perspective view of a clip used in the form of invention shown in Figure 6; and Figure 8 is a rear elevation showing a modified form in which an anchor blade is used on the supporting rod.

On the accompanying drawing, I have used the reference character A to indicate a rod-like supporting member and B, a loop-like plant encircling member. The member A is ordinarily thrust into the ground 10, while the members B are used to encircle plants 12, 14 and 16, for instance.

The plant encircling member B is of peculiar construction and specifically comprises a piece of resilient wire suitably bent to form a closed, plural coil, spirally wound, engaging element 18 having much the appearance of a sleeve-like coil spring. Plant encircling arms 20 and 22 are formed of the wire and extend from the ends of the sleeve-like engaging element 18. The terminal ends of the arms 20 and 22 are hooked, as indicated at 24 and 26 respectively. The hooks 24 and 26 are adapted to engage with each other as shown in Figure 3 for encircling a plant.

The relation of the internal diameter of the sleeve-like element 18 and the external diameter of the rod-like support A is very important. When the hooks 24 and 26 are engaged as in Figure 3, then without the rod A in position, the internal diameter of the coiled element 18 is slightly less than the diameter of the rod A. Therefore, when the rod is in position, the sleeve-like element 18 binds on it.

The binding just mentioned effectively supports the member B in a plane at right angles to the axis of the rod A. Since there are a plurality of coils in the sleeve-like element 18, substantial length is thus provided to prevent either up and down movement of the outer end of the plant encircling member B or up and down movement of one of its sides relative to the other side.

Since the tendency of the sleeve 18 is to have a smaller internal diameter than the diameter of the rod A, it will be obvious that since it cannot be reduced to such a diameter when the rod A is therein, the resiliency of the arms when they are sprung together and hooked will effectively cause the binding action.

In Figure 4, the arms 20 and 22 are unhooked and permitted to swing to their normal position. The internal diameter of the sleeve 18 is now larger than the rod A. Actually, on the drawing, the difference is greatly exaggerated as not more than a few thousandths of an inch is required to release the sleeve 18 so that it can be moved up and down or rotated relative to the rod quite freely. It is quite important that the arms 20 and 22 extend across the rear of the rod A, or in other words that the sleeve 18 be located within the loop formed by the arms 20 and 22. If it is on the outside, the binding would occur when the arms 20 and 22 are expanded rather than when they are contracted.

In Figure 2, I have shown how an exceptionally tall plant can be supported by two of the plant encircling members B. A tomato plant, for instance, can be thus supported and as it grows, the encircling arms can be readily adjusted vertically to accommodate it.

In Figure 5, I have shown how the plant encircling member B can be used to retain mulch 28, such as leaves or the like on a plant when it is mulched for the winter. Thus it will be obvious that my plant support has utility other than for the mere purpose of supporting a plant. It is thus adaptable for use throughout the year rather than mere seasonable use.

In Figure 6, I have shown a binder clip C. It is merely a piece of metal or the like, preferably of obtuse angle formation having legs 30 and 32 perforated as indicated at 34 and 36, respectively. This clip is used when it is desirable to decrease the diameter of the loop-like plant encircling arms.

The clip C is adapted to have the hook 24 hooked in the perforation 34 and the perforation 36 receiving the arm 22. Since the tendency of the arms is to expand the loop, the hook 24 tends to move in the direction of the arrow $a$, thus causing a binding action of the edges of the perforation 36 on the arm 22. After adjustment is effected, then the hook 26 can be hooked over the other arm 20 so that it will not project out in the way.

If trouble is experienced in the rod A tending to rotate in soft ground or when the wind is blowing, an anchor blade 38 may be secured thereto as by spot welding or the like (see Figure 8). The blade is adapted to enter the ground 10 and will obviously prevent undesired rotation. It is preferably pointed on both the lower and upper end to make it easier to insert and withdraw into and from the ground.

The rods A and the wire encircling loops B may be made in various sizes and also various sizes for one rod may be made. In Figure 8, I have shown two different sizes of the plant encircling loop B. The smaller sizes are preferably formed with fewer coils in the sleeve-like engaging portion 18 as illustrated in this figure. This is because the sleeve need not be so long for smaller diameters of plant encircling loops and also that with a greater number of coils, it is not so easy to swing the arms from open to closed position. On the larger loops where the arms are longest, greatest leverage is had so that this difficulty is not experienced. On the smaller loops, however, fewer coils in the element 18 can be provided so that the arms having less leverage can still be easily manipulated for closing the sleeve 18 about the rod A.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A plant supporting member comprising a piece of resilient wire wound to provide a coil spring-like engaging element and a pair of plant encircling arms of loop-like formation when said arms are secured together and a binder clip having perforations receiving said arms.

2. A plant supporting member comprising a piece of resilient wire wound to provide a coil spring-like engaging element and a pair of plant encircling arms of loop-like formation when said arms are secured together and a binder clip having a perforation receiving one of said arms, the end of the other arm being pivotally connected with said binder clip.

3. A plant supporting member comprising a piece of resilient wire wound to provide a coil spring-like engaging element and a pair of plant encircling arms of loop-like formation when said arms are secured together, a binder clip receiving said arms and located adjacent the end of one of them and a hook on the end of the other one to receive the opposite arm.

4. In a plant support, an upstanding rod-like supporting member and a horizontal plant encircling member, said plant encircling member being formed of resilient material, and comprising a spirally wound, plural coil, sleeve-like element receiving said supporting member, a pair of plant encircling arms extending laterally from the ends of said sleeve-like element, across the back of said supporting member and terminating in front thereof and a binder clip receiving said arms.

5. In a plant support, an upstanding rod-like supporting member and a horizontal plant encircling member, said plant encircling member being formed of resilient material and comprising a spirally wound, plural coil, sleeve-like element receiving said supporting member, a pair of plant encircling arms extending laterally from the ends of said sleeve-like element, across the back of said supporting member and terminating in front thereof and a binder clip receiving one of said arms, the end of the other arm being pivotally connected therewith.

6. In a plant support, an upstanding rod-like supporting member, an anchor blade secured thereto and extending laterally therefrom and a horizontal plant encircling member, said plant encircling member being formed of resilient material and comprising a spirally wound, plural coil, sleeve-like element receiving said supporting member, a pair of plant encircling arms extending laterally from the ends of said sleeve-like element, across the back of said supporting member and terminating in front thereof, a binder clip receiving said arms and means for connecting the terminal ends of said arms together.

7. A plant supporting member comprising a resilient wire wound to provide a coil spring-like engaging element and a pair of plant encircling arms of loop-like formation when said arms are secured together, a binder clip receiving said arms, a rod-like supporting element received in said coil-spring like engaging element and an anchor blade secured to said rod-like supporting element.

8. A plant supporting member comprising a piece of resilient wire wound to provide a closed coil, spirally wound, engaging element and a pair of plant encircling arms of loop-like formation when said arms are secured together, a binder clip engaging said arms and a rod-like supporting element received in said engaging element.

THOMAS RITCHIE.